US008024375B2

(12) United States Patent
Sasaki

(10) Patent No.: US 8,024,375 B2
(45) Date of Patent: Sep. 20, 2011

(54) METHOD AND APPARATUS FOR PROCESSING MESSAGES

(75) Inventor: Osamu Sasaki, Chuo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 11/744,361

(22) Filed: May 4, 2007

(65) Prior Publication Data

US 2007/0265997 A1 Nov. 15, 2007

(30) Foreign Application Priority Data

May 12, 2006 (JP) ................................. 2006-134448

(51) Int. Cl.
*G06F 7/00* (2006.01)
(52) U.S. Cl. ......... 707/804; 707/922; 719/315; 709/205
(58) Field of Classification Search ........................ None
See application file for complete search history.

(56) References Cited

U.S. PATENT DOCUMENTS

| 2005/0086594 A1* | 4/2005 | Schlimmer et al. ............ 715/515 |
| 2005/0138210 A1* | 6/2005 | Shkvarchuk et al. ......... 709/246 |
| 2006/0123039 A1* | 6/2006 | Scheuerle et al. ............ 707/102 |
| 2006/0279772 A1* | 12/2006 | Ludwig et al. ............... 358/1.15 |
| 2007/0143829 A1* | 6/2007 | Hinton et al. ..................... 726/5 |

FOREIGN PATENT DOCUMENTS

| JP | 2002-108788 A | 4/2002 |
| JP | 2005-166032 A | 6/2005 |

OTHER PUBLICATIONS

Steve Loughram, "Fear of Attachments", Feb. 3, 2003, http://www.mail-archive.com/axis-user@xml.apache.org/msg08732/Fear_of_Attachments.pdf.*
Stephanie Bodoff et al., The J2EE tutorial, 2nd Edition, Prentice Hall, Jun. 29, 2004.*
Adam Bosworth, et al., Proposed Infoset Addendum to SOAP Messages with Attachments, Version 0.61 Draft, Apr. 1, 2003.*
V B Kumar Jayanti, and Marc Hadley, SOAP with Attachments API for Java (SAAJ) 1.3, Jul. 2005.*
Frank Sommers, "SAAJ: No Strings attached", JavaWorld, http://www.javaworld.com/javaworld/jw-09-2003/jw-0912-webservices.html, Sep. 12, 2003.*
Madhusudhan Govindaraju, et al. "Toward Characterizing the Performance of SOAP toolkits", Proceedings of the fifth IEEE/ACM International workshop on Grid Computing (GRID'04).*
Ying Ying, Yan Huang, and David W. Walker, "Using SOAP with Attachments for e-Science", in Proceedings of the UK e-Science All Hands Meeting 2004, held Aug. 31-Sep. 3, 2004 in Nottingham, UK, edited by S.J.Cox. ISBN 1-904425-21-6.*
J. Barton et al., SOAP Message with Attachments, http://www.w3.org/TR/2000/NOTE-SOAP-attachments-20001211, pp. 1-10, Dec. 11, 2000, Hewlett Packard Labs, Microsoft Corporation.

* cited by examiner

*Primary Examiner* — Vei-Chung Liang
(74) *Attorney, Agent, or Firm* — Canon U.S.A., Inc. I.P. Division

(57) ABSTRACT

A memory stores a file attached to a message generated by using a structure language. Data containing an element contained in the message to which information for obtaining type information and a file referred by the element are obtained from the memory is added is constructed. This data has a construction corresponding to an application programming interface for the structured language.

12 Claims, 10 Drawing Sheets

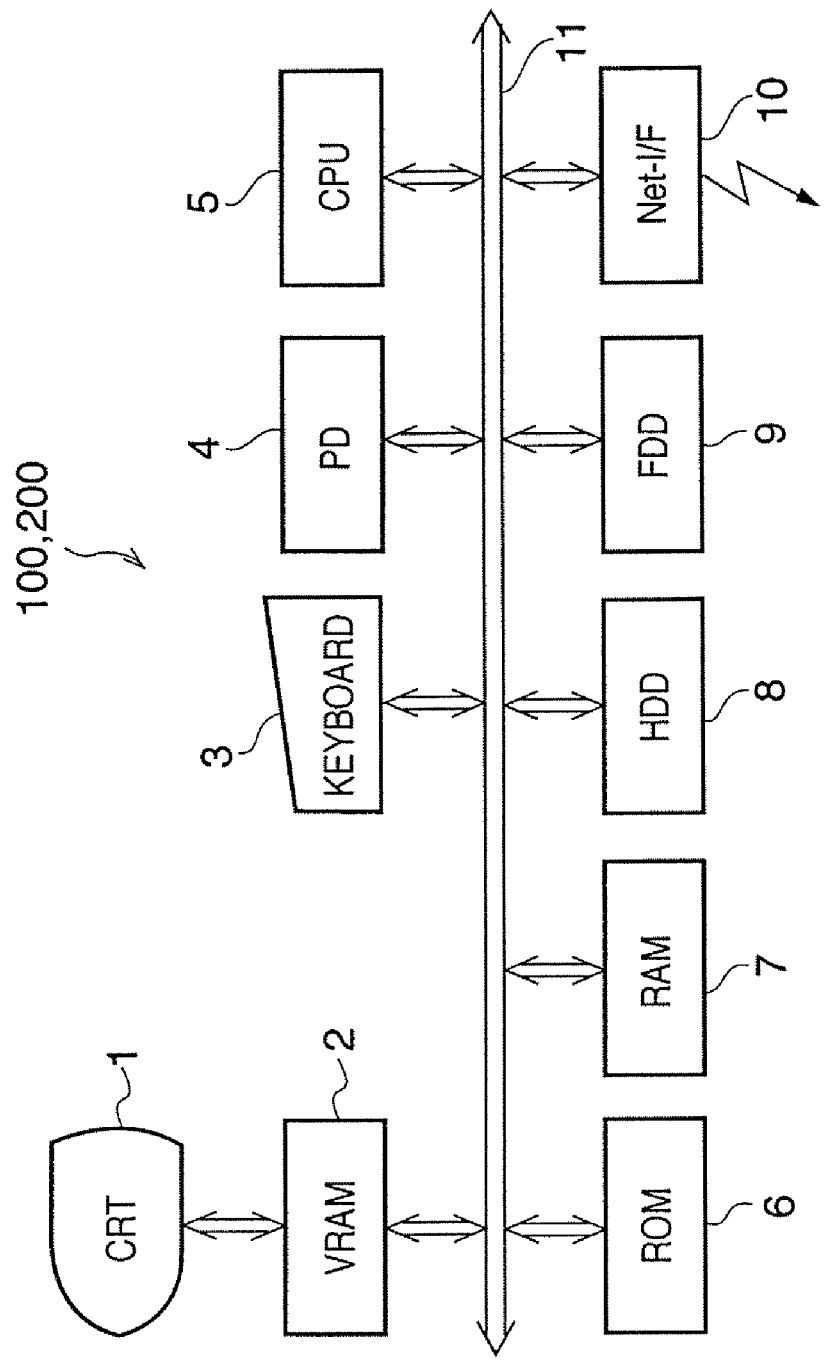

METHOD AND APPARATUS FOR PROCESSING MESSAGES

BACKGROUND OF THE INVENTION

1. Field of the Invention

The present invention relates to a method and an apparatus for processing messages.

2. Description of the Related Art

In recent times, various services are provided through computer networks. Currently, web service related techniques are attracting attention. A Web Service is a mechanism for allowing computers to dynamically exchange data by using various protocols, typified by HTTP, without manual operation. In a Web Service, SOAP messages flow on a communication protocol to allow various computer devices, built-in devices, and the like to simultaneously receive different pieces of information.

Since a SOAP message is generated in Extensible Markup Language (XML), some contrivance is required to transmit binary data, such as image data. In general, the following methods are used: a method of converting binary data into a character string on the basis of base64 or the like, and embedding the converted data in XML, to be referred to as the character string conversion method hereinafter, and a method using an attached file such as a MIME multi-part file, to be referred to as the file attachment method hereinafter.

The character string conversion method has a problem, in that it requires a processing time overhead to convert binary data into a character string, or to convert a character string back into binary data, depending on the size of the binary data. Therefore, the latter file attachment method is more generally used to transmit or receive large-volume binary data together with a SOAP message.

The file attachment method transmits a SOAP message and an attached file as one message, via a communication protocol such as HTTP. Note that the message is segmented into a SOAP message fragment and an attached file fragment by a delimiter character string that is determined by a specification. When attaching an attached file, the file attachment method can attach binary data to a message without requiring conversion. The file attachment method therefore need not perform processing such as converting binary data into a character string or restoring binary data from a character string, and hence has a advantage of high processing efficiency, compared with the character string conversion method.

In the file attachment method, a SOAP message moving over the communication protocol is packaged in a non-XML format as a message format for attached files, e.g., the MIME multi-part format. For this reason, applications and libraries designed to handle only XML cannot process messages based on the file attachment method. In addition, according to specifications designed to handle only XML, such as WS-BPEL or XPath as well, a message generated by the file attachment method does not have a structure as an XML structure as a whole, and hence, some inconvenience occurs.

In general, a program, library, or the like which handles XML is programmed by using a Document Object Model (DOM) interface, as defined by W3C. A DOM interface is an interface standardized to allow access from a program to XML data. A program or library that supports a DOM interface can directly exchange data, or can easily convert data and use the resultant data, even though it cannot directly exchange the data.

A DOM interface can perform processing by tracking back an XML tree structure, and hence can be used for XML for general purposes. However, as described above, a message with an attached file has a SOAP message contained in part of the content, but expresses an attached file as a MIME multi-part file as a whole. Hence, it is generally impossible to operate the overall message by using the DOM interface. In such a case, in general, an attached file is separated from a SOAP message to allow to handle only the SOAP message portion as an XML data by using the DOM interface.

As described above, when large-volume binary data, such as image data, is to be handled in a Web Service, communication is generally performed with minimum processing overhead by using the file attachment method. This method, however, allows using a DOM interface only for a SOAP message separated from a message in, for example, the MIME multi-part format. That is, the method allows using a DOM interface based on a general XML processing method for only a part of a message. Inability to use DOM amounts to inability to use general-purpose libraries. This leads to a considerable deterioration in the reuse efficiency of a program. In addition, this causes inconvenience in the WS-BPEL specifications, the XPath specifications, and the like, based on the assumption that they handle XML. Therefore, handling binary data in messaging using SOAP leads to a considerable increase in development load.

SUMMARY OF THE INVENTION

The present invention provides an apparatus and method which allow using a standard Application Programming Interface (API) to an overall message while using the file attachment method.

According to another aspect, the present invention provides a processing method of processing a message generated by using a structured language, which comprises the steps of: storing a file attached to the message in a memory; and constructing data having construction corresponding to an application programming interface for the structured language and including the element included in the message to which type information and information for obtaining from the memory the file referred by the element is added.

According to still another aspect, the present invention provides a generating method of generating a message with an attached file from data having a data structure corresponding to an application interface for a structured language, the method comprising the steps of: obtaining content data referred by an element included in the data; and generating, from the element, a message by using the structured language, in which the acquired content data is embedded as an attached file and information for referring to the attached file is recorded in an element which refers to the content data.

According to still another aspect, the present invention provides a processing apparatus which processes a message generated by using a structured language, the apparatus comprising: a storing unit adapted to store a file attached to the message; and a constructing unit adapted to construct data having construction corresponding to an application programming interface for the structured language and including the element included in the message to which type information and information for obtaining from the memory the file referred by the element is added.

According to still another aspect, the present invention provides a generating apparatus which generates a message with an attached file from data having a data structure corresponding to an application interface for a structured language, the apparatus comprising: an obtaining unit adapted to obtain content data referred by an element included the data; and a generating unit adapted to generate, from the element, a message by using the structured language, in which the acquired content data is embedded as an attached file and information for referring to the attached file is recorded in an element which refers to the content data.

Further features of the present invention will become apparent from the following description of exemplary embodiments, with reference to the attached drawings.

BRIEF DESCRIPTION OF THE DRAWINGS

FIG. 1B is a block diagram showing an example of the hardware arrangement of a client and server apparatus according to the embodiment.

DESCRIPTION OF THE EMBODIMENTS

A preferred embodiment of the present invention will be described below with reference to the accompanying drawings.

Figure 1A:
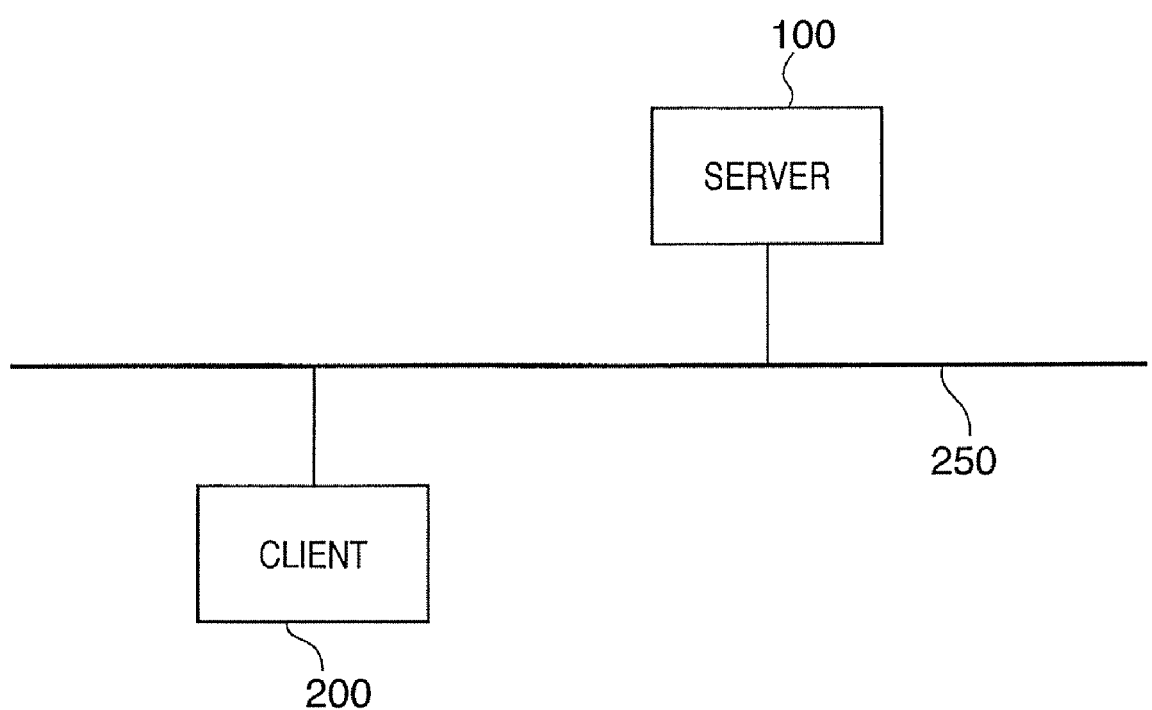
FIG. 1A is a block diagram showing an example of the arrangement of a network system which implements a Web Service according to an embodiment.

FIG. 1A is a block diagram showing an example of the arrangement of a network system according to this embodiment. The network system includes a server 100 having a function of providing a Web Service and a client 200 having a function of using a Web Service. The server 100 and the client 200 connect to each other through a network 250 such as the Internet or a LAN. The server 100 and the client 200 communicate (exchange messages) with each other through the network 250 by using, for example, SOAP messages. Note that the server 100 and the client 200 can be implemented by general-purpose computers, peripheral devices such as printers or cameras having network functions, or information terminal apparatuses such as cell phones or PDAs having network functions.

FIG. 1B is a view for explaining an example of the arrangement of a server and client according to this embodiment. This embodiment will exemplify a case wherein information processing apparatuses (computers) are used as the server 100 and the client 200.

Referring to FIG. 1B, reference numeral 1 denotes a CRT which displays information of data under processing by an application program, various kinds of message menus, and the like; 2, a video RAM (to be referred to as a VRAM hereinafter) in which an image to be displayed on the screen of the CRT 1 is drawn; 3 and 4, a keyboard and a pointing device, respectively, which are used, for example, to input characters and the like in predetermined fields on a window and point icons and buttons on a GUI; and 5, a CPU which controls the overall apparatus.

Reference numeral 6 denotes a ROM storing processing procedures (programs) for the CPU 5. Note that the ROM 6 also stores application programs associated with data processing, an error processing program, and programs associated with the flowcharts to be described later. Reference numeral 7 denotes a RAM which is used as a work area used when the CPU 5 executes various kinds of programs and as a temporary save area at the time of error processing.

Reference numeral 8 denotes a hard disk drive (to be referred to as an HDD hereinafter); and 9, a floppy disk drive (to be referred to as an FDD hereinafter). The respective disks are used to store and read application programs, data, libraries, and the like. It suffices to provide an optical (or magnetic) disk drive such as a CD-ROM, MO, or DVD, a magnetic tape drive such as a tape streamer or DDS, and the like in place of or in addition to an FDD.

Reference numeral 10 denotes a network interface for connecting the apparatus to a network; and 11, an I/O bus (comprising an address bus, data bus, and control bus) which connects the above units to each other. The CPU 5 implements the processes to be described below by executing the programs stored in the ROM 6. Alternatively, the CPU 5 may implement the processes by executing the programs loaded from the HDD 8 or the FDD 9 into the RAM 7.

Figure 2:
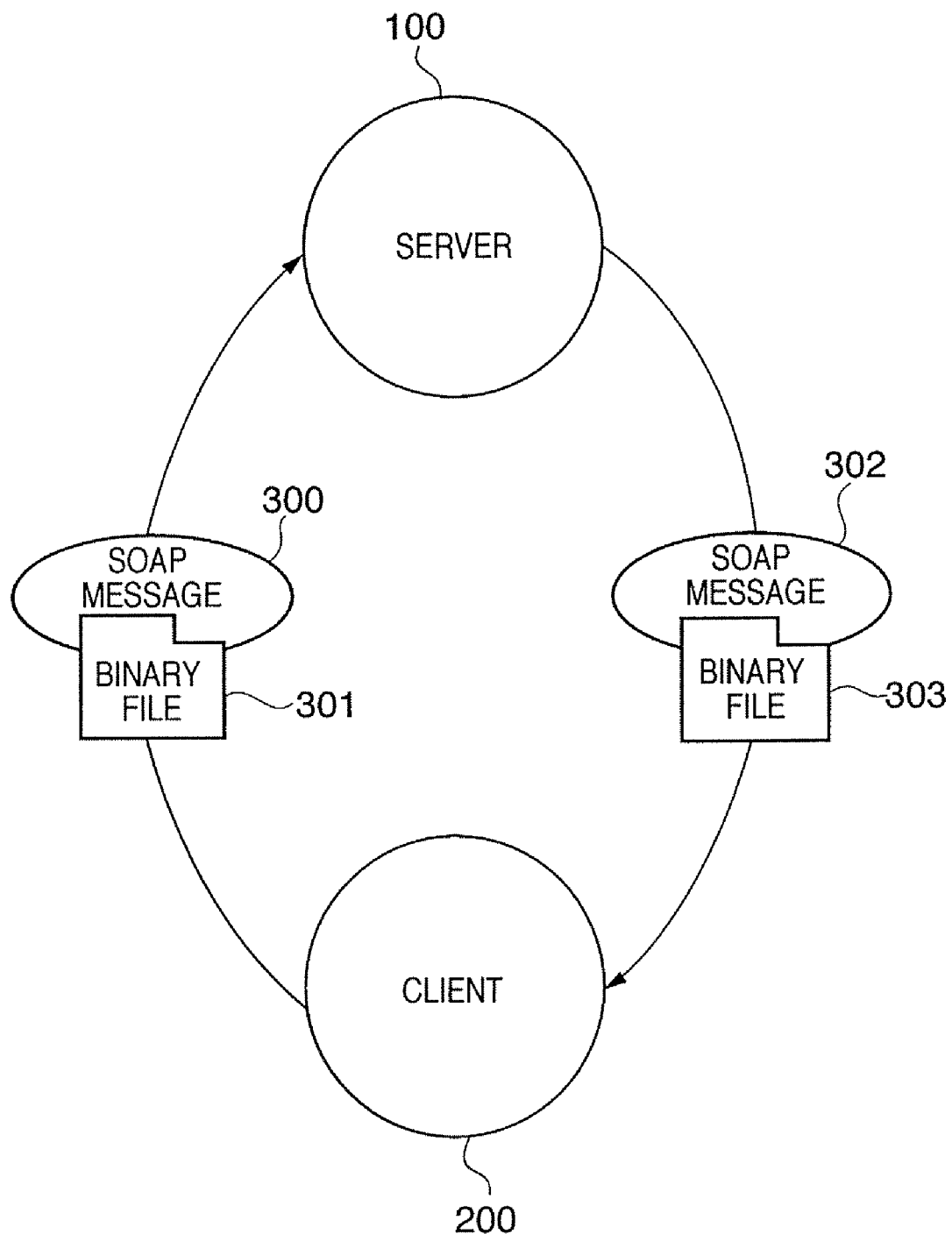
FIG. 2 schematically depicts communication between a server 100 and a client 200 according to the embodiment.

FIG. 2 is a view schematically showing communication of SOAP messages between the server 100 and the client 200 according to this embodiment. The client 200 is in a position to use a Web Service, and transmits a SOAP message 300 necessary for the service to be used to the server 100. At this time, if the SOAP message 300 has a binary file, the client 200 also transmits a binary file 301 to the server 100 in accordance with the file attachment method.

The server 100 executes the Web Service in accordance with the SOAP message 300 from the client 200, and returns a SOAP message 302 as a result of the execution to the client 200. In this case, it may sometimes be necessary to attach a binary file 303 to the SOAP message 302.

Each of the SOAP messages 300 and 302 is one of XML documents. Since an XML document is obtained by expressing structured data in the form of a text, it is essentially impossible to embed binary data in XML. As described above, therefore, binary data is added by using either the character string conversion method or the file attachment method. According to the file attachment method, since binary data is attached as a binary file by using the MIME multi-part format or the like, there is no need to convert the binary data into a character string. On the other hand as described above, if an attached file format such as the MIME multi-part format is used, the resultant data structure differs from the XML data structure. This makes it impossible to use API such as DOM corresponding to XML. This embodiment exemplifies a SOAP message processing method which compensates for such a drawback. Note that a SOAP message based on the file attachment method will be referred to as a SOAP message with an attached file.

Figure 3:
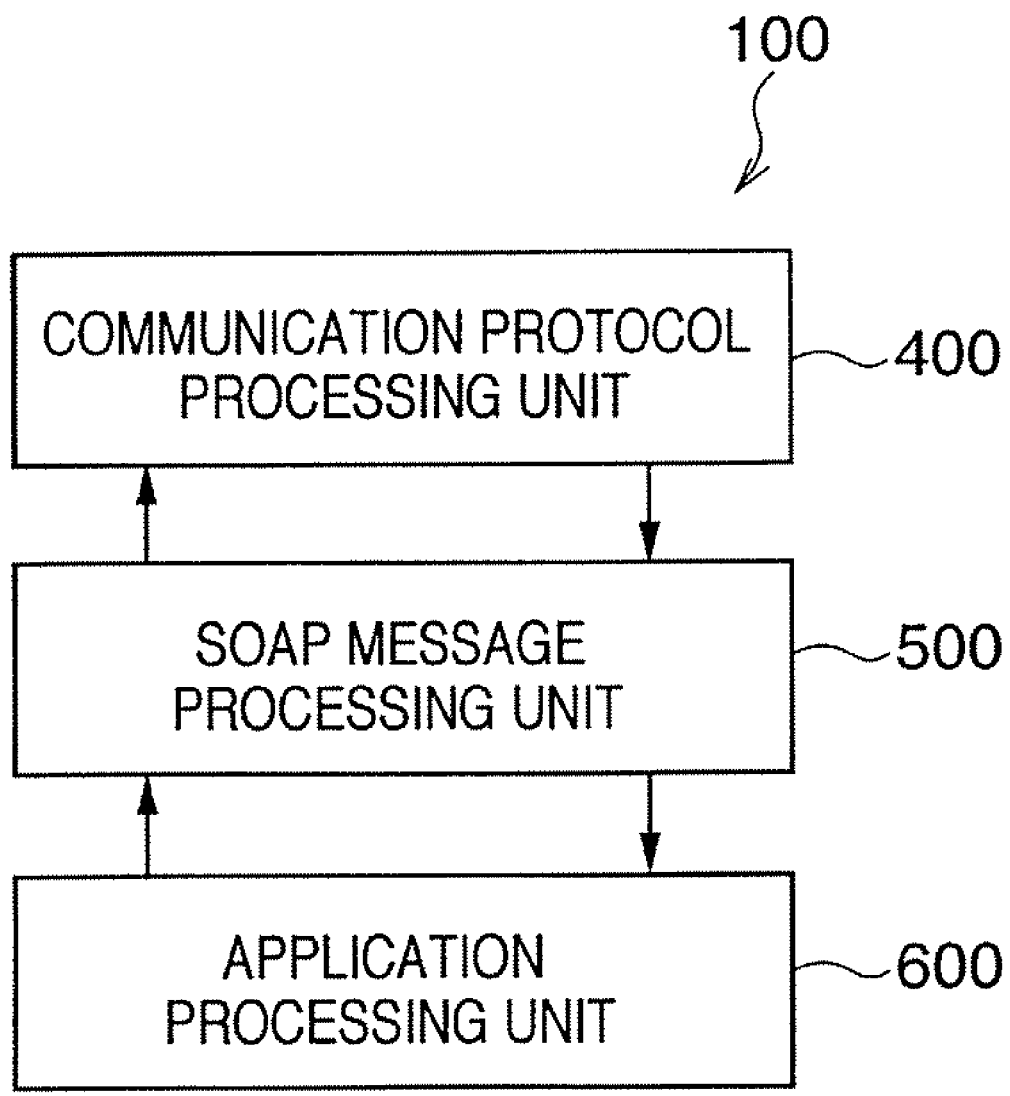
FIG. 3 is a block diagram schematically showing a software arrangement in the server 100 according to the embodiment.

FIG. 3 is a block diagram schematically showing an example of the arrangement of software associated with SOAP message processing (information processing) inside the server 100 (information processing apparatus) according to this embodiment.

A communication protocol processing unit 400 transmits/receives a communication protocol on which a SOAP message such as an HTTP message is placed. The communication protocol processing unit 400 performs processing such as separating a received SOAP message with an attached file into a message body and a message header or the like, and transfers the SOAP message to a SOAP message processing unit 500.

The SOAP message processing unit 500 develops the SOAP message into a data model structure to be described later and converts data having a data model structure into a SOAP message. The SOAP message developed into a data model structure by the SOAP message processing unit 500 is transferred to an application processing unit 600.

The application processing unit 600 executes the processing which the server 100 provides as a Web Service with respect to the SOAP message transferred from the SOAP message processing unit 500, and transfers the result to the SOAP message processing unit 500.

The SOAP message processing unit 500 converts the data of the data model structure transferred from the application processing unit 600 into a SOAP message (a SOAP message with an attached file). The message converted into the SOAP message is returned to the communication protocol processing unit 400, and is transmitted (returned) to the client by using a communication protocol such as HTTP.

Figure 4:
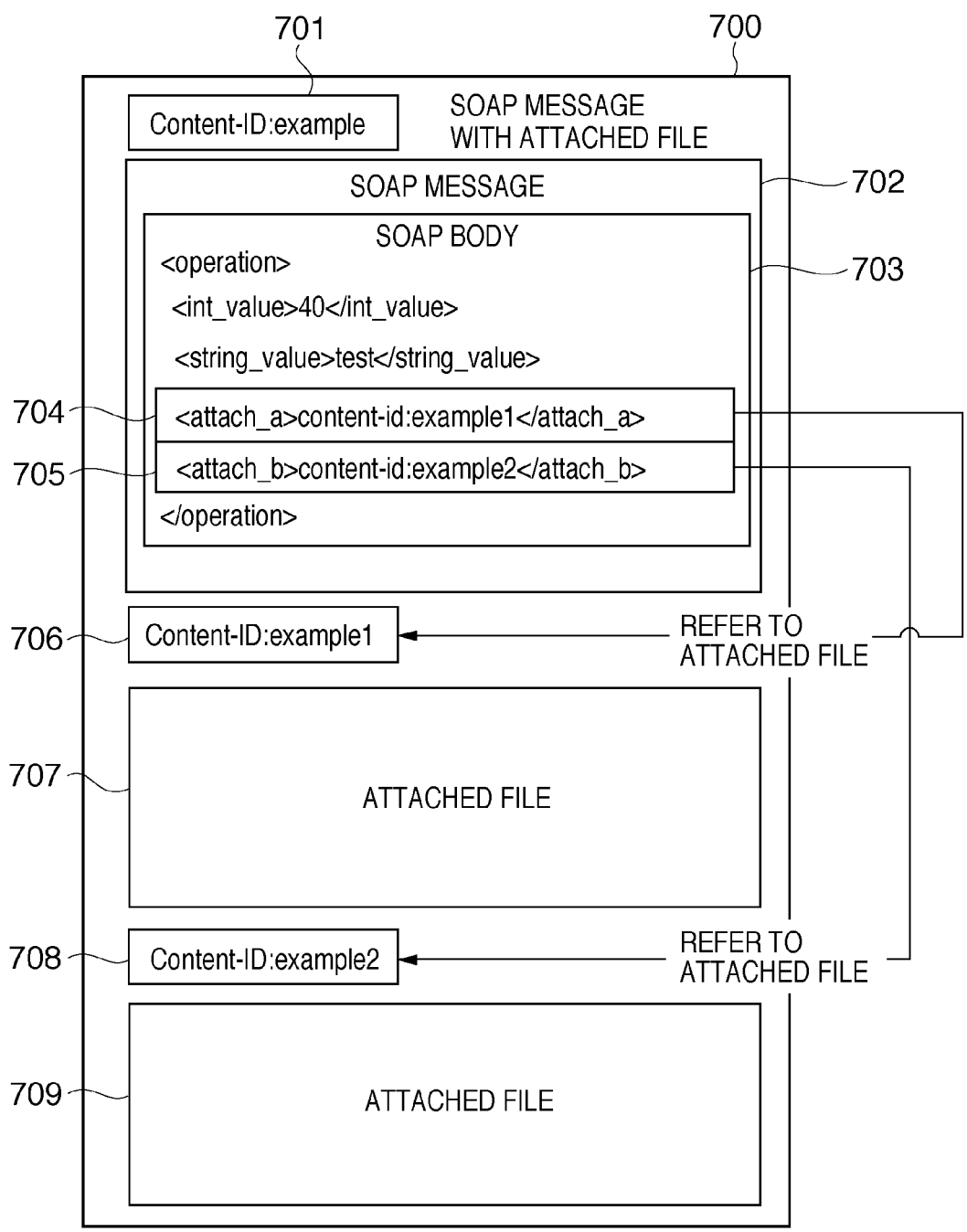
FIG. 4 is a view schematically showing an example of the data arrangement of a SOAP message with an attached file.

FIG. 4 is a view schematically showing a SOAP message with an attached file. Content-IDs 701, 706, and 708 are respectively attached to a SOAP message 702 and attached files 707 and 709 in a SOAP message 700 with an attached file. Elements 704 and 705 contained in a SOAP body 703 in the SOAP message 702 associate the SOAP message 702 with the attached files 707 and 709 by referring to the values of the Content-IDs 706 and 708 of the respective attached files with URIs.

Figure 5:
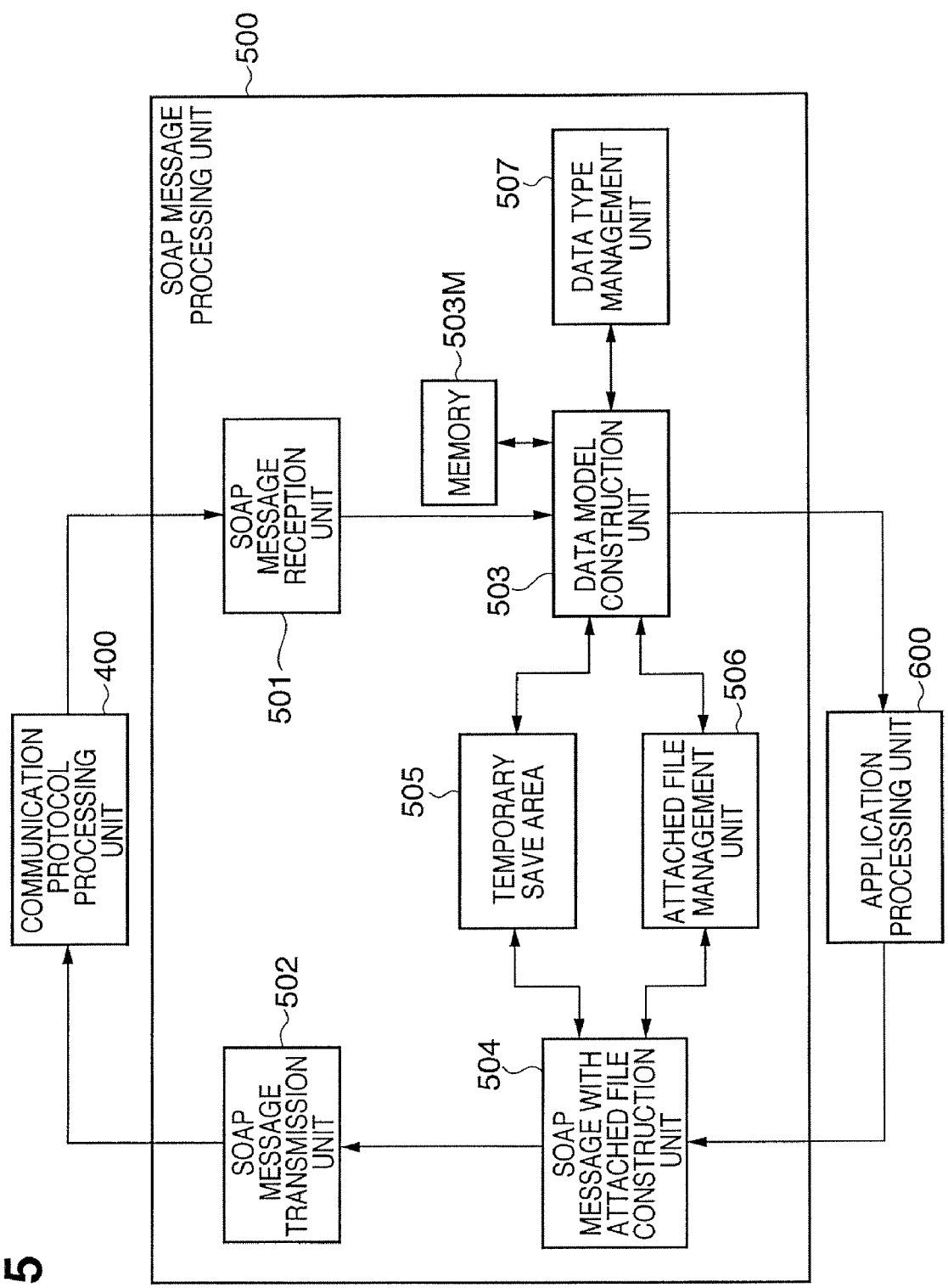
FIG. 5 is a block diagram showing the detailed arrangement of a SOAP message processing unit 500.

FIG. 5 is a block diagram showing the detailed arrangement of the SOAP message processing unit 500 shown in FIG. 3.

A SOAP message reception unit 501 receives a SOAP message from the communication protocol processing unit 400, and transfers it to a data model construction unit 503. The data model construction unit 503 renders the SOAP message in the text format received from the SOAP message reception unit 501 in a memory 503M as a data model having a data structure to be described later. In this case, the data model construction unit 503 adds type information to each element of the SOAP message on the basis of the type information registered in advance in a data type management unit 507. If the SOAP message sent from the SOAP message reception unit 501 is a SOAP message with an attached file, the data model construction unit 503 separates the attached filed from the message. The data model construction unit 503 then stores the separated attached file in a temporary save area 505, and registers information indicating the relation between the save location of the attached file and the Content-ID of the attached file in an attached file management unit 506. Assume that the RAM 7 includes the temporary save area 505, attached file management unit 506, data type management unit 507, and memory 503M.

The application processing unit 600 receives the data constructed by the data model construction unit 503 and performs service processing provided by the server 100. The application processing unit 600 then sends the processing result to a SOAP message with attached file construction unit 504. The SOAP message with attached file construction unit 504 specifies the location of the attached file from the attached file information or Content-ID written in the data model received from the application processing unit 600 by using the attached file management unit 506. The SOAP message with attached file construction unit 504 acquires the specified attached file from the temporary save area 505. The SOAP message with attached file construction unit 504 reshapes the SOAP message into a message in the data format of the attached file, and transmits the reshaped SOAP message to a SOAP message transmission unit 502. The SOAP message transmission unit 502 transfers the message received from the SOAP message with attached file construction unit 504 to the communication protocol processing unit 400. The communication protocol processing unit 400 replies to the SOAP message transmitted from the client by transmitting this SOAP message to the client.

Figure 6A:
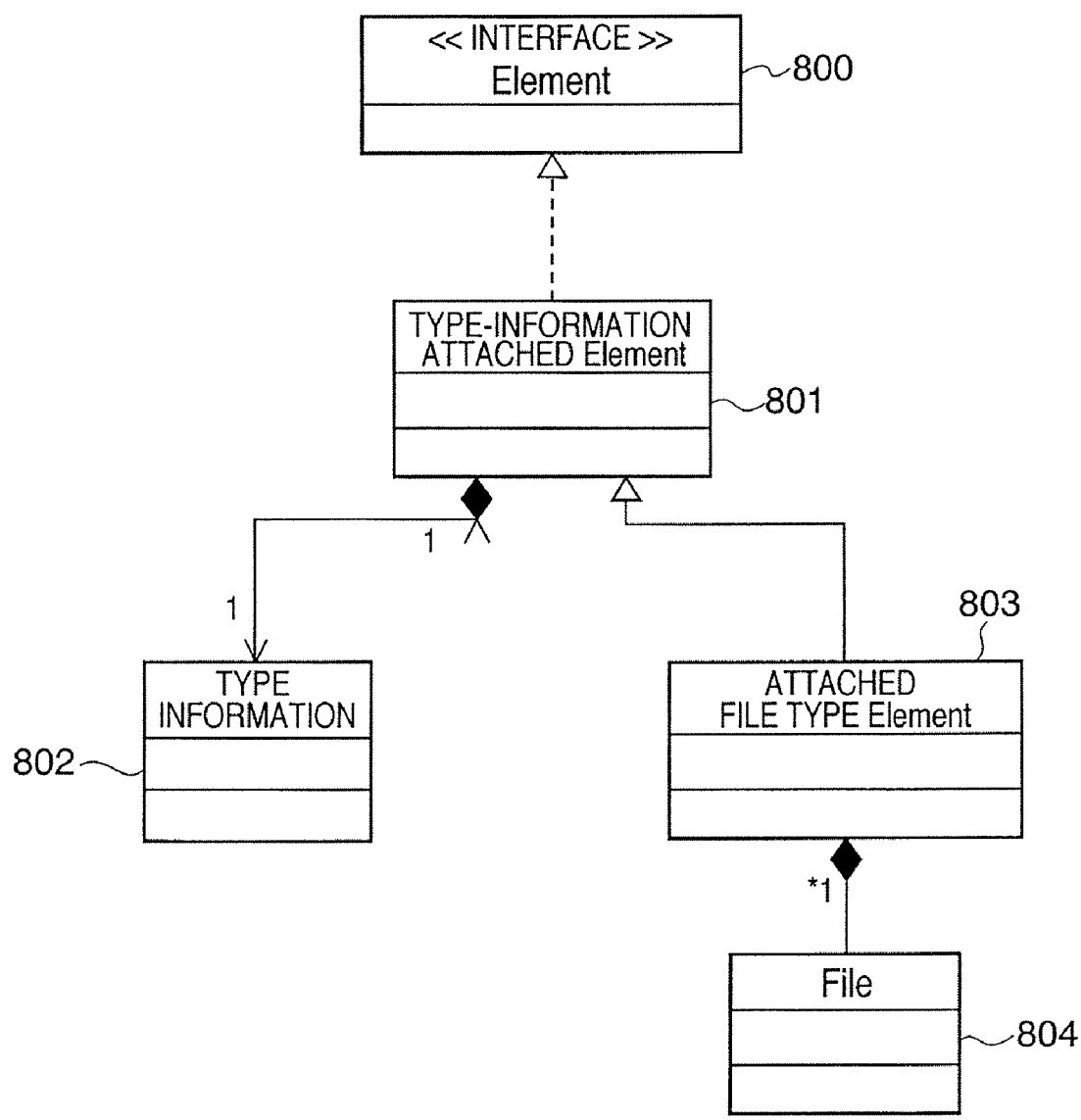
FIG. 6A is a schematic view of a model describing the data structure of a data model used according to the embodiment.

FIG. 6A is a view for explaining the data structure of a data model constructed by the data model construction unit 503. An Element interface 800 is an interface which is defined and standardized by W3C (an interface standardized to allow access from a program to XML data). A type information attached element class 801 incorporates an Element interface. The type information attached element class 801 aggregates type information 802. This allows to recognize the type of a value corresponding to each element. An attached file type element 803 aggregates a File class 804 abstractly expressing the path of the file. The attached file type element 803 is a child class of the type information attached element class 801, and can hold the type information 802 together with a reference to the File class 804.

Figure 7:
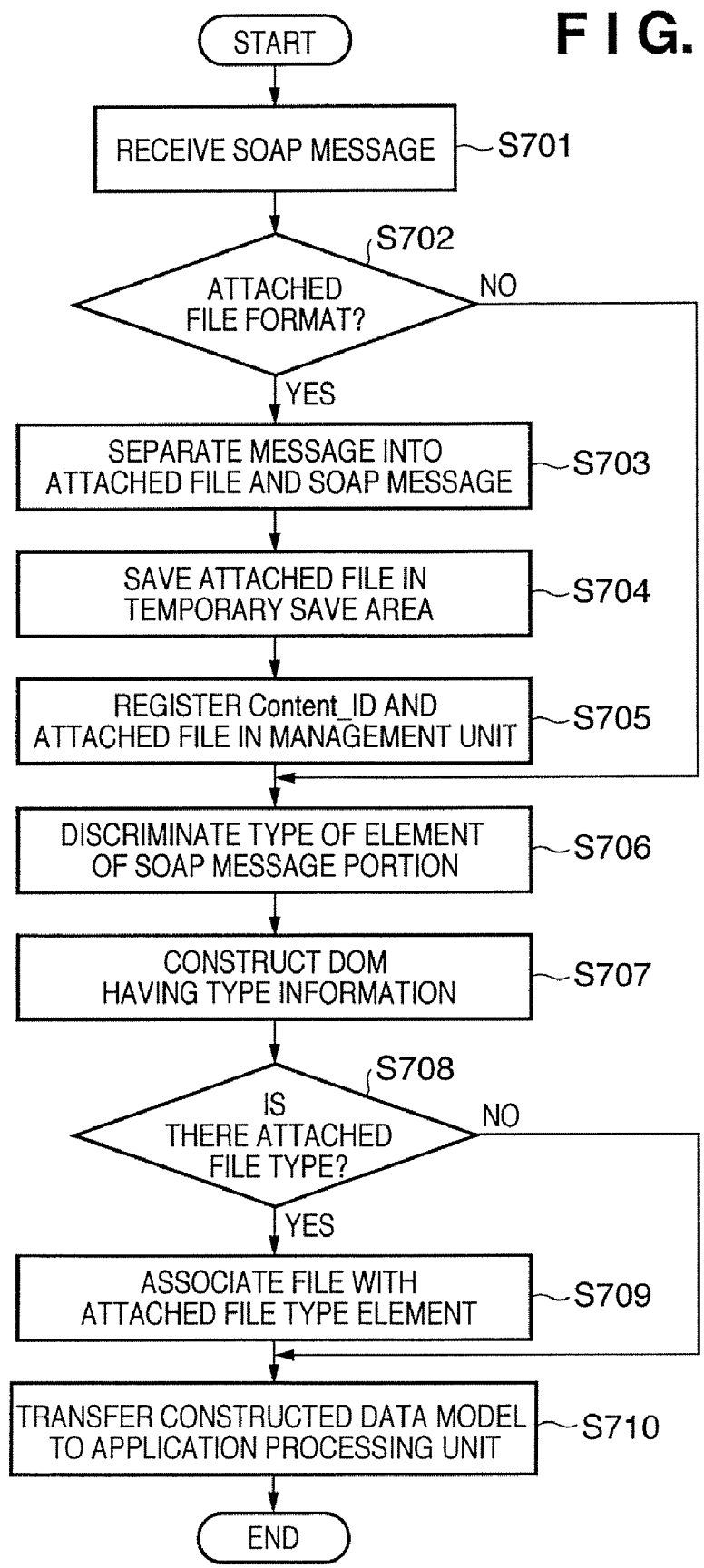
FIG. 7 is a flowchart showing a control procedure for a data model construction unit according to the embodiment.

FIG. 7 is a flowchart showing a control procedure for the data model construction unit 503 in FIG. 5. Upon receiving a SOAP message from the communication protocol processing unit 400 (step S701), the data model construction unit 503 determines whether the SOAP message is in the general SOAP message format or the attached file format (e.g., the MIME multi-part format) (step S702). Upon determining that the message is in the attached file format, i.e., a SOAP message with an attached file, the data model construction unit 503 separates the message into a SOAP message portion and an attached file (step S703). For example, the data model construction unit 503 separates the SOAP message 700 with the attached file into the SOAP message 702 and the attached files 707 and 709. The data model construction unit 503 then saves the attached files in the temporary save area 505 (step S704), and registers the save locations of the files in the temporary save area 505 and the Content-IDs in the attached file management unit 506 (step S705). For example, the data model construction unit 503 saves the attached file 707 in the temporary save area 505, and registers the correspondence between the save location and example1 as a Content-ID in the attached file management unit 506. Likewise, the data model construction unit 503 saves the attached file 709 in the temporary save area 505 and registers the correspondence between the save location and example2 as a Content-ID in the attached file management unit 506. Note that if it is determined in step S702 that the message is a general SOAP message, the process directly advances to step S706.

In step S706, the data model construction unit 503 determines the type of each element contained in the SOAP body 703 of the separated SOAP message 702 by referring to the information registered in advance in the data type management unit 507. The data model construction unit 503 then constructs data complying with the DOM interface which holds type information along the data structure of the above data model (data having a structure corresponding to the DOM interface holding this type information) (step S707). The data model constructed in the above manner has type information added to each element.

Figure 6B:
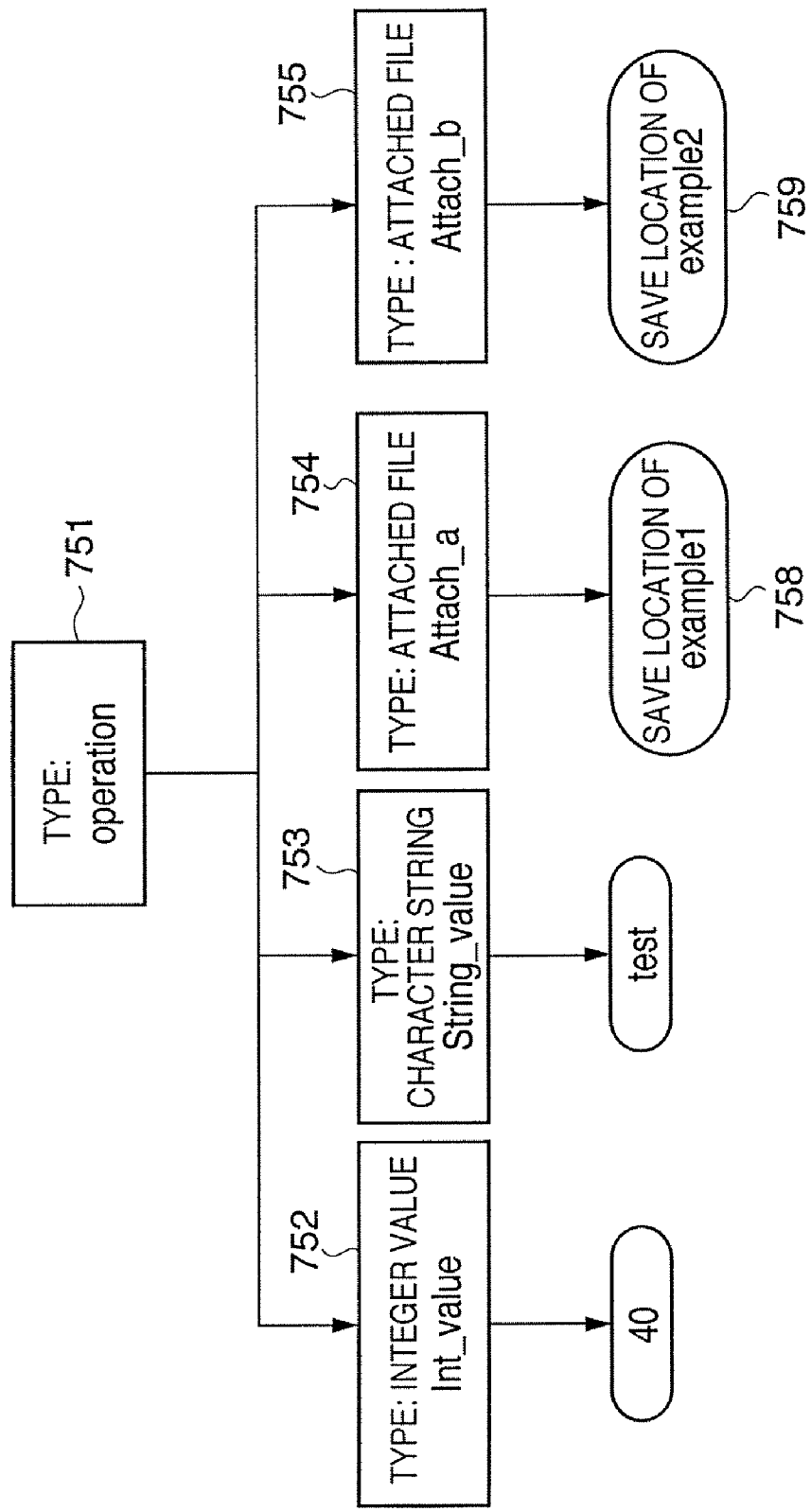
FIG. 6B is a view showing an example of developing SOAP body elements shown in FIG. 4 into a data model structure.

FIG. 6B shows this state. FIG. 6B is a view showing an example of developing the elements of the SOAP body 703 shown in FIG. 4 in accordance with the data model structure shown in FIG. 6A. Elements like <operation> and <int_value> are rendered into a tree structure (a DOM tree in this embodiment), and type information is added to each of elements 752 to 755. The correspondence between each element name (and/or each attribute) in SOAP (XML) and type information in the data model is registered in the data type management unit 507. The data model construction unit 503 acquires type information corresponding to each element of the SOAP body 703 by referring to the data type management unit 507, and adds type information to each element. That is, the data model construction unit 503 adds type information to each element on the basis of the element names and/or attributes of XML.

The data model construction unit 503 then checks the constructed data model to determine whether it contains any attached file type element (step S708). Upon determining that the model contains an attached file type element, the data model construction unit 503 checks the save location of the content (attached file) having the Content-ID of the element by referring to the attached file management unit 506. The data model construction unit 503 then associates the save location as the instance of the File class 804 with the attached file type element 803 (step S709). For example, as shown in FIG. 6B, type information indicating an attached file format is added to each of the elements 754 and 755. The data model construction unit 503 therefore acquires the save locations of the respective contents (attached files) in the temporary save area 505 from the attached file management unit 506 in accordance with the Content-IDs (example1 and example2) of the respective elements, and associates the save locations as instances 758 and 759. Note that the Content-IDs (example1 and example2) may be written as the instances 758 and 759. If the data model contains no attached file type element, the process skips step S709 and advances to step S710.

The data model construction unit 503 generates a data model and transfers it to the application processing unit 600 in the above manner. An application can process a SOAP message according to the same procedure as that of XML using a general DOM in accordance with a data model which complies with a DOM interface and to which attached file information is added by using an extension portion.

Although a new type based on an XML schema may be defined as an attached file type, the swaRef type defined by WS-I Attachment Profile may replace this. That is, an attached file reference of the swaRef type can be used in a SOAP message. Using the swaRef type allows messaging of an attached file complying with WS-I Attachment Profile.

Figure 8:
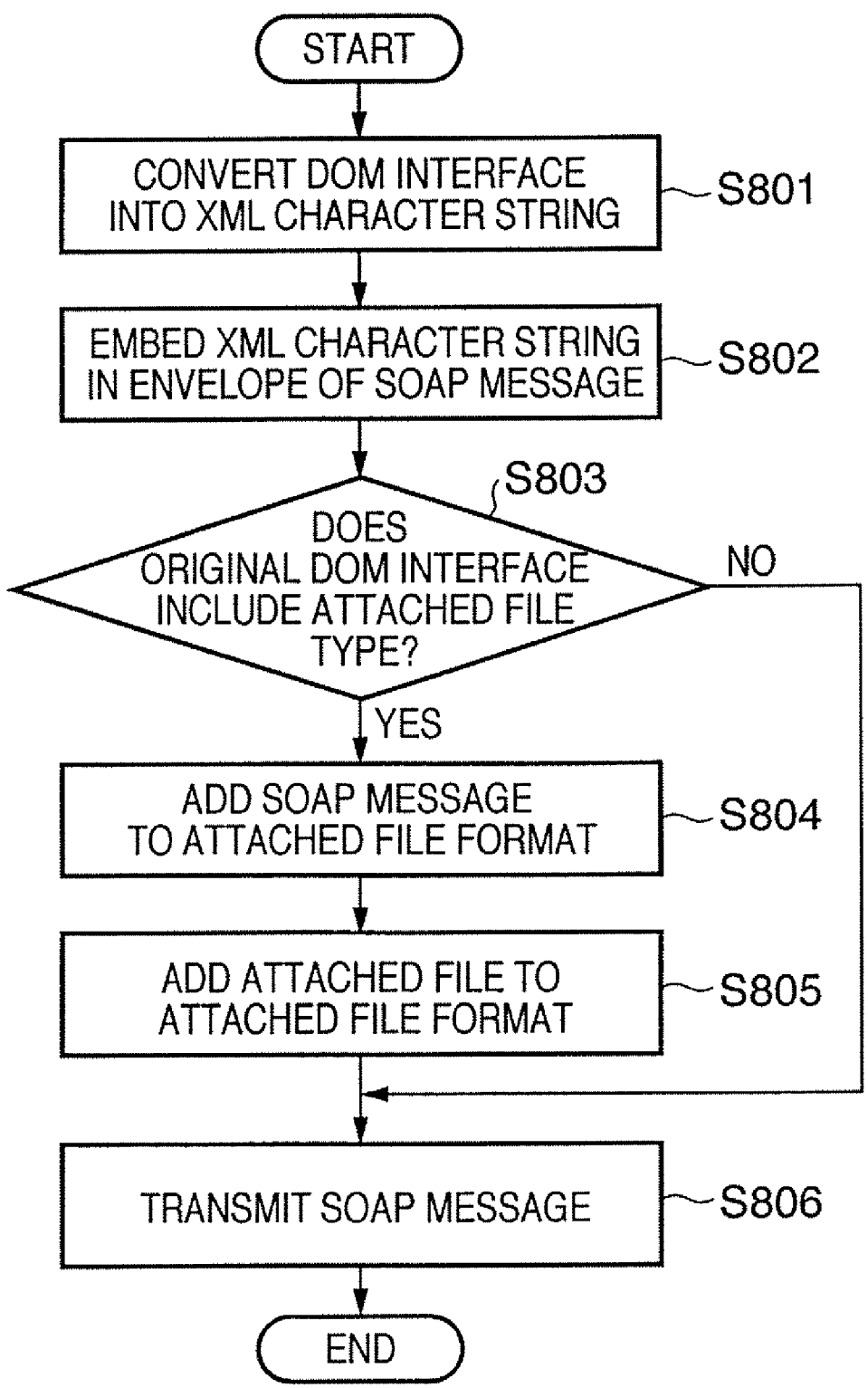
FIG. 8 is a flowchart showing a control procedure for a SOAP message with attached file construction unit according to the embodiment.

Processing by the SOAP message with attached file construction unit 504 will be described next. FIG. 8 is a flowchart showing a control procedure for the SOAP message with attached file construction unit 504 shown in FIG. 5.

Upon receiving a data model from the application processing unit 600, the SOAP message with attached file construction unit 504 acquires XML information from a DOM interface and converts the data model into an XML character string (step S801). The SOAP message with attached file construction unit 504 then adds the data converted into the XML character string to the envelope of a SOAP message to construct a general SOAP message (step S802). For example, upon receiving the data of a data model structure like that shown in FIG. 6B, the SOAP message with attached file construction unit 504 converts this into XML data to generate the SOAP body 703. The SOAP message with attached file construction unit 504 then inserts the generated SOAP body in the envelope of the SOAP message to generate the SOAP message 702. At this point of time, Content-IDs are written in elements (704 and 705) for file reference in accordance with the instances 758 and 759 in FIG. 6B. Note that if Content-IDs are written in the instances 758 and 759, they are used without any change. If the save locations of data (attached files) are written in the instances 758 and 759, the Content-IDs of attached files corresponding to the save locations are acquired from the attached file management unit 506 and written in the elements 704 and 705.

The SOAP message with attached file construction unit 504 then discriminates the data type of each element of the received data model, and discriminates whether there is any attached file type element (step S803). Upon determining that there is an attached file type element, the SOAP message with attached file construction unit 504 adds the SOAP message constructed in step S802 to the attached data file format (e.g., MIME multi-part format) data (step S804). The SOAP message with attached file construction unit 504 then acquires the save location of a content (file) of the Content-ID designated by the attached file format element from the attached file management unit 506. The SOAP message with attached file construction unit 504 acquires the corresponding content from the temporary save area 505 in accordance with the acquired save location, and adds the acquired content as an attached file to the above attached file format data. In this manner, a SOAP message in the attached file format is constructed. The SOAP message transmission unit 502 then transfers the SOAP message constructed by the SOAP message with attached file construction unit 504 to the communication protocol processing unit 400 (step S806).

For example, as shown in FIG. 6B, if there are attached file type elements 754 and 755, the SOAP message with attached file construction unit 504 embeds the SOAP message 702 in the SOAP message 700 with the attached file. In this case, if the IDs (Content-IDs) of contents are registered in the instances 758 and 759, the save locations of the contents (attached files) corresponding to the Content-IDs can be acquired by referring to the attached file management unit 506. The SOAP message with attached file construction unit 504 acquires the entities of the contents from the save locations and embeds them as attached files (707 and 709) in the SOAP message 700 with the attached file, together with the Content-IDs (706 and 708). In addition, if save locations are written in the instances 758 and 759, the SOAP message with attached file construction unit 504 can acquire contents from the save locations and embed them as the attached files 707 and 709 in the SOAP message 700 with the attached file. In this case, Content-IDs corresponding to the save locations are acquired from the attached file management unit 506, and are written as the Content-IDs (706 and 708) of the message 700.

If the data model includes no attached file type element, the SOAP message with attached file construction unit 504 does not process the SOAP message into a message in the attached file format. That is, the SOAP message with attached file construction unit 504 transfers the SOAP message generated in step S802 to the SOAP message transmission unit 502 without any change. The SOAP message transmission unit 502 transfers this SOAP message to the communication protocol processing unit 400 (step S806).

The communication protocol processing unit 400 transmits the SOAP message (or the SOAP message with the attached file) constructed in the above manner to the client. In this manner, a general SOAP message or a SOAP message with an attached file can be returned to the client.

Executing the control procedure shown in the flowcharts of FIGS. 7 and 8 makes it possible to operate a SOAP message with an attached file by using, for example, a DOM interface without converting binary data into a characteristic string.

The data processing method according to this embodiment can link binary data to the inside of a data model having a DOM interface. This makes it possible to execute a Web Service with respect to a SOAP message with an attached file by using an interface which processes DOM as a general XML processing method, without spending any overhead like conversion of binary data into a character string. In addition, this embodiment allows to use an external library having a DOM interface without changing the data model.

As has been described above, the above embodiment can implement a Web Service system suitable for handling binary files by using SOAP messages with attached files. According to the above embodiment, when a server provides a Web Service function by using a SOAP message with a binary file, a general-purpose XML processing method can be used.

Note that the above embodiment has been described by using XML as a structured language on a text basis, SOAP as a message exchange protocol based on a structured language on a text basis, and DOM as an API corresponding to a structured language on a text basis.

The object of the present invention is achieved even by supplying a storage medium storing software program codes for implementing the functions of the above embodiment to a system or apparatus, and causing the computer (or CPU or MPU) of the system or apparatus to read out and execute the program codes stored in the storage medium. In this case, the program codes read out from the storage medium implement the functions of the above embodiment by themselves, and the storage medium storing the program codes constitutes the present invention.

As a storage medium for supplying the program codes, a flexible disk, hard disk, optical disk, magnetooptical disk, CD-ROM, CD-R, magnetic tape, nonvolatile memory card, ROM, DVD, or the like can be used.

The functions of the above embodiment are implemented not only when the readout program codes are executed by the computer but also when the OS (Operating System) running on the computer performs part or all of actual processing on the basis of the instructions of the program codes.

The functions of the above embodiment are also implemented when the program codes read out from the storage medium are written in the memory of a function expansion board inserted into the computer or a function expansion unit connecting to the computer, and the CPU of the function expansion board or function expansion unit performs part or all of actual processing on the basis of the instructions of the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-134448, filed May 12, 2006, which is hereby incorporated by reference herein in its entirety.

What is claimed is:

1. A processing method of processing a simple object access protocol (SOAP) message generated by using a structured language, the method comprising the steps of:
   receiving the SOAP message;
   detaching a file from the SOAP message when the file is attached to a body of the received SOAP message;
   storing the file detached from the received SOAP message in a memory;
   determining type information corresponding to an element in the body of the SOAP message based on pre-registered type information including an attached file type indicating that the element in the body of the received SOAP message refers the file attached to the body of the received SOAP message;
   constructing data having construction corresponding to an application programming interface for the structured language and including the element in the of the received SOAP message, to which the determined type information is added in the constructing step, on the basis of the element in the body of the received SOAP message;
   adding, as an instance of the element to which the attached file type is added in the constructed data, information for obtaining from the memory the file referred by the element to which the attached file type is added, to the element to which the attached file type is added in the constructed data;
   processing data constructed in the step of constructing;
   outputting a processing result having the construction;
   obtaining, from the memory, the file referred by an element included in the processing result; and
   generating, from the element of the processing result, a second SOAP message by using a structure language, to which the file obtained is attached and in which information for referring to the file is recorded in an element which refers to the file.

2. The method according to claim 1, wherein in the step of storing, a file attached to the SOAP message in a MIME multi-part format is stored in the memory.

3. The method according to claim 1, wherein in the step of constructing, data of a tree structure is constructed on the basis of elements contained in the SOAP message.

4. The method according to claim 1, wherein the application programming interface is a DOM (Document Object Model) interface.

5. A processing apparatus which processes a simple object access protocol (SOAP) message generated by using a structured language, the apparatus comprising:
   a memory;
   a receiving unit configured to receive the SOAP message;
   a constructing unit configured to manage correspondence between an element in a body of the received SOAP message and type information including an attached file type indicating that the element in the body of the received SOAP message refers to the file attached to the body of the received SOAP message, detach the file from the SOAP message when the file is attached to the body of the received SOAP message, store the file detached from the received SOAP message in the memory, determine the type information corresponding to an element in the body of the received SOAP message based on the managed relation, construct data having construction corresponding to an application programming interface for the structured language and including the element in the body of the received SOAP message to which the determined type information is added by the constructing unit, on the basis of the element in the body of the received SOAP message, and add, as an instance of the element to which the attached file type is added in the constructed data, information for obtaining from the memory the file referred by the element to which the attached file type is added, to the element to which the attached file type is added in the constructed data;
   a processing unit configured to process data constructed by said constructing unit and output a processing result having the construction;
   an obtaining unit configured to obtain, from the memory, the file referred by an element included in the processing result; and a generating unit configured to generate, from the element of the processing result, a second SOAP message by using a structure language, to which the file obtained is attached and in which information for referring to the file is recorded in an element which refers to the file.

6. The apparatus according to claim 5, wherein said memory stores a file attached to the SOAP message in a MIME multi-part format.

7. The apparatus according to claim 5, wherein said constructing unit constructs data of a tree structure on the basis of elements contained in the SOAP message.

8. The apparatus according to claim 5, wherein the application programming interface is a DOM interface.

9. A computer-readable storage medium storing a computer program for processing a simple object access protocol (SOAP) message generated by using a structured language, the computer program causing a computer to execute:

receiving the SOAP message;

detaching the file from the SOAP message when the file is attached to a body of the received SOAP message;

storing the file detached from the received SOAP message in a memory;

determining type information corresponding to an element in the body of the received SOAP message based on pre-registered type information including an attached file type indicating that the element in the body of the received SOAP message refers the file attached to the body of the received SOAP message;

constructing data having construction corresponding to an application programming interface for the structured language and including the element in the body of the received SOAP message, to which the determined type information is added in the constructing step, on the basis of the element in the body of the received SOAP message;

adding, as an instance of the element to which the attached file type is added in the constructed data, information for obtaining from the memory the file referred by the element to which the attached file type is added, to the element to which the attached file type is added in the constructed data;

processing data constructed in the step of constructing;

outputting a processing result having the construction;

obtaining, from the memory, the file referred by an element included the processing result; and generating, from the element of the processing result, a second SOAP message by using a structure language, to which the file obtained is attached and in which information for referring to the file is recorded in an element which refers to the file.

10. The medium according to claim 9, wherein in the step of storing, a file attached to the SOAP message in a MIME multi-part format is stored in the memory.

11. The medium according to claim 9, wherein in the step of constructing, data of a tree structure is constructed on the basis of elements contained in the SOAP message.

12. The medium according to claim 9, wherein the application programming interface is a DOM interface.

* * * * *